United States Patent
Melsert et al.

(10) Patent No.: US 10,464,815 B2
(45) Date of Patent: Nov. 5, 2019

(54) HIGH TEMPERATURE THERMOCHEMICAL ENERGY STORAGE SYSTEM

(71) Applicant: Southern Research Institute, Birmingham, AL (US)

(72) Inventors: Ryan Melsert, Reno, NV (US); Santosh Kumar Gangwal, Cary, NC (US); Tim A. Hansen, Raleigh, NC (US)

(73) Assignee: Southern Research Institute, Birmingham, AL (US)

( * ) Notice: Subject to any disclaimer, the term of this patent is extended or adjusted under 35 U.S.C. 154(b) by 0 days.

(21) Appl. No.: 15/183,101

(22) Filed: Jun. 15, 2016

(65) Prior Publication Data

US 2017/0362090 A1    Dec. 21, 2017

(51) Int. Cl.
| | |
|---|---|
| *C01B 32/50* | (2017.01) |
| *B01J 20/04* | (2006.01) |
| *B01J 20/10* | (2006.01) |
| *C01B 32/60* | (2017.01) |

(52) U.S. Cl.
CPC ............ *C01B 32/50* (2017.08); *B01J 20/041* (2013.01); *B01J 20/10* (2013.01); *C01B 32/60* (2017.08); *Y02C 10/08* (2013.01); *Y02P 20/13* (2015.11)

(58) Field of Classification Search
CPC ........ C01B 32/50; C01B 32/60; B01J 20/041; B01J 20/10; F24J 2/0023
See application file for complete search history.

(56) References Cited

U.S. PATENT DOCUMENTS

| | | |
|---|---|---|
| 4,343,989 A | 8/1982 | Brosnan |
| 2009/0148369 A1 | 6/2009 | Mori |
| 2010/0196259 A1 | 8/2010 | Garg et al. |
| 2011/0100356 A1 | 5/2011 | Bliesner |
| 2012/0025134 A1 | 2/2012 | Feng et al. |
| 2012/0134906 A1 | 5/2012 | Mastin et al. |

(Continued)

FOREIGN PATENT DOCUMENTS

| | | |
|---|---|---|
| CN | 103746083 A | 4/2014 |
| WO | WO-2013/003948 | 1/2013 |

OTHER PUBLICATIONS

Chacartegui, R., et al. "Thermochemical energy storage of concentrated solar power by integration of the calcium looping process and a CO2 power cycle." Applied energy 173 (2016): 589-605.*

(Continued)

*Primary Examiner* — Richard M Rump
(74) *Attorney, Agent, or Firm* — Ballard Spahr LLP

(57) ABSTRACT

A thermochemical energy storage system and method of storing thermal energy are disclosed. The energy storing system described herein comprises a reactor comprising a $CO_2$ sorbent comprising i) CaO and mayenite or ii) $Li_4SiO_4$, or a combination thereof, and b) a $CO_2$ source, wherein the $CO_2$ source is in fluid communication with the reactor to allow flow of $CO_2$ between the $CO_2$ source and the reactor. Further, methods are disclosed for storing thermal energy through a wide temperature range.

20 Claims, 8 Drawing Sheets

(56) References Cited

U.S. PATENT DOCUMENTS

2012/0164032 A1* 6/2012 Wormser ............... C10B 49/10 422/162
2013/0333391 A1 12/2013 Sundaram et al.

OTHER PUBLICATIONS

Luo, Cong, et al. "Enhanced cyclic stability of $CO_2$ adsorption capacity of CaO-based sorbents using $La_2O_3$ or $Ca_{12}Al_{14}O_{33}$ as additives." Korean Journal of Chemical Engineering 28.4 (2011): 1042-1046.*

Phalak, Nihar, Niranjani Deshpande, and L.-S. Fan. "Investigation of high-temperature steam hydration of naturally derived calcium oxide for improved carbon dioxide capture capacity over multiple cycles." Energy & Fuels 26.6 (2012): 3903-3909.*

Li, Y-J., et al. "CO2 capture using CaO modified with ethanol/water solution during cyclic calcination/carbonation." Chemical engineering & technology 31.2 (2008): 237-244.*

Gangwal, S., Muto, A. "Demonstration of High-Temperature Calcium-Based Thermochemical Energy Storage System for Use with Concentrating Solar Power Facilities" CSP Program Summit 2015 (Presented Apr. 2016).*

Derevschikov, et al, High Temperature CaO/Y2O3 Carbon Dioxide Absorbent with Enhanced Stability for Sorption-Enhanced Reforming Applications, I&EC research, 2011, 50, 12741-12749 (10 Pages).

Chen, et al, Development of a CaO-Based Sorbent with Improved Cyclic Stability for CO2 Capture in Pressurized Carbonation, Chemical Engineering Journal 171 (2011) 197-205 (11 Pages).

Criado et al, Conceptual Process Design of a CaO/Ca(OH)2 Thermochemical Energy Storage System Using Fluidized Bed Reactors (34 pages).

Vieille et al, Improvements of Calcium Oxide Based Sorbents for Multiple CO2 Capture Cycles, Powder Technology, Elsevier, 2012, 228, pp. 319-323 (11 Pages).

Martavaltzi et al, Development of New CaO Based Sorbent Materials for CO2 Removal at High Temperature, Science Direct, Microporous and Mesoporous Materials 110 (2008) 119-127 (9 pages).

Sabina Nwamaka Ude, Synthesis and Characterization of Doped Mayenite as a Transparent Conducting Oxide, University of Tennessee, May 2013, Doctoral Dissertation (169 pages).

Dursun Can Ozcan, Development of a Sorbent for Carbon Dioxide, Iowa State University, Graduate Theses and Dissertation, 2010 (108 Pages).

Radfarnia et al, Development of Zirconium-Stabilized Calcium Oxide Absorbent for Cyclic High-Temperature CO2 Capture, Ind. Eng. Chem. Res., 2012, 51 (31), pp. 10390-10398, Abstract (1 page).

Manovic et al, CaO-Based Pellets Supported by Calcium Aluminate Cements for High-Temperature CO2 Capture, Environ. Sci. Technol., 2009, 43 (18), pp. 7117-7122, Abstract (1 page).

Manovic et al, CO2 Carrying Behavior of Calcium Aluminate Pellets under High-Temperature/High-CO2 Concentration Calcination Conditions, Ind. Eng. Chem. Res., 2010, 49 (15), pp. 6916-6922, Abstract (1 Page).

Martavaltzi et al, Parametric Study of the CaO—Ca12Al14O33 Synthesis with Respect to High CO2 Sorption Capacity and Stability on Multicycle Operation, Ind. Eng. Chem. Res., 2008, 47 (23), pp. 9537-9543, Abstract (1 Page).

Li et al, Synthesis, Experimental Studies, and Analysis of a New Calcium-Based Carbon Dioxide Absorbent, Energy Fuels, 2005, 19 (4), pp. 1447-1452, Abstract (1 Page).

* cited by examiner (a)

(b)

HIGH TEMPERATURE THERMOCHEMICAL ENERGY STORAGE SYSTEM

GOVERNMENT LICENSE RIGHTS MADE UNDER FEDERALLY SPONSORED RESEARCH AND DEVELOPMENT

This invention was made with government support under DE-EE0006535 awarded by the Department of Energy (DOE). The government has certain rights in the invention.

BACKGROUND

Societal energy demands are constantly increasing while fossil fuel resources, the main energy resource of many national energy systems, are limited and predicted to become scarcer, and as a result to become more expensive in coming years. Furthermore, many concerns exist regarding the environmental impacts associated with continuous drilling and pumping of the fossil fuels from the Earth's crust and increasing energy consumption. Specifically, concerns have been raised regarding the possible effect of increased use of fossil fuels on climate change and atmospheric pollution.

Changes are required in energy systems, partly through the adoption of advanced energy technologies and systems to address these serious environmental concerns. The anticipated worldwide increase in energy demand and concern regarding environmental problems has become a driving force for the utilization of more efficient and cleaner energy technologies. Examples include advanced systems for waste energy recovery and energy integration. Important technologies that can contribute to avoiding environmental problems and increasing the efficiency of energy consumption include thermal energy storage (TES), and more specifically, thermochemical energy storage (TCES).

Thermal energy storage is especially an important technology in systems involving renewable energy sources as well as other energy resources as it can make their operation more efficient. One example is bridging the periods between when energy is harvested and when it is needed. For example, the next generation of advanced concentrating solar power (CSP) plants are being designed to increase the sunlight to electricity conversion efficiency, and one of the major techniques to enact this increase is through the use of receivers, heat transfer fluids (HTF), thermal energy storage systems, and power blocks that operate at high temperatures. It was found that CSP systems, for example, require thermal energy storage to be competitive with conventional grid scale power generation systems. Thus, TES can play an important role in increasing the contribution of various types of renewable energy in the energy production of regions and countries.

Various TES technologies and applications exist. The selection of a TES system for a particular application depends on many factors, including storage duration, economics, supply and utilization temperature requirements, storage capacity, heat loss and available space.

More compact TES can be achieved based on a system that utilize chemical reactions. However, the current-state-of the-art molten salt based thermal storage systems are unable to operate in the high temperature range required, for example, in CSP systems. High temperature thermal energy is generally stored as sensible heat in either molten salt or synthetic organic heat transfer oil. However, these mediums store heat in a very low volumetric energy density and are not able to store heat above 500° C.

Therefore, thermochemical energy storage systems exhibiting very high volumetric energy density and capable of operating through a wide temperature range are needed. Even further, improved methods for storing energy would be desirable.

Accordingly, such thermochemical energy storage systems and methods for storing energy are described herein.

SUMMARY OF THE INVENTION

Disclosed herein is a system for storing energy comprising: a) a reactor comprising a $CO_2$ sorbent comprising i) CaO and mayenite or ii) $Li_4SiO_4$, or a combination thereof; and b) a $CO_2$ source, wherein the $CO_2$ source is in fluid communication with the reactor to allow flow of $CO_2$ between the $CO_2$ source and the reactor.

Also disclosed herein is a method of storing energy comprising the steps of: a) in a reactor, heating 1) $CaCO_3$ and mayenite or 2) $Li_2CO_3$ and $Li_2SiO_3$, or a combination thereof, thereby promoting an endothermic chemical reaction to produce $CO_2$ and a $CO_2$ sorbent comprising i) CaO and mayenite or ii) $Li_4SiO_4$, or a combination thereof; b) separating the $CO_2$ from the $CO_2$ sorbent.

Additional advantages will be set forth in part in the description which follows, and in part will be obvious from the description, or can be learned by practice of the aspects described below. The advantages described below will be realized and attained by means of the chemical compositions, methods, and combinations thereof particularly pointed out in the appended claims. It is to be understood that both the foregoing general description and the following detailed description are exemplary and explanatory only and are not restrictive of the invention, as claimed.

DESCRIPTION OF THE FIGURES

The accompanying figures, which are incorporated in and constitute a part of this specification, illustrate several aspects, and together with the description, serve to explain the principles of the invention.

DETAILED DESCRIPTION

Figure 1:
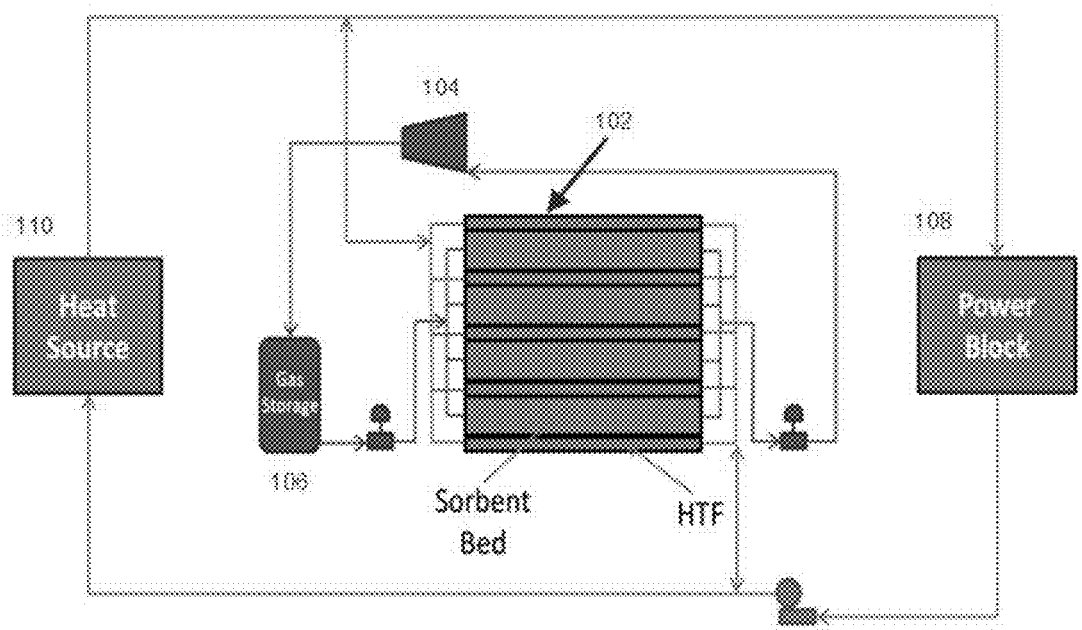
FIG. 1 shows a process flow diagram of a TCES system described herein.

The present invention can be understood more readily by reference to the following detailed description of the invention.

Disclosed herein are systems, materials, compounds, compositions, and components that can be used for, can be used in conjunction with, can be used in preparation for, or are products of the disclosed method and compositions. It is to be understood that when combinations, subsets, interactions, groups, etc. of these materials are disclosed that while specific reference of each various individual and collective combinations and permutation of these compounds cannot be explicitly disclosed, each is specifically contemplated and described herein. This concept applies to all aspects of this disclosure including, but not limited to, steps in methods of making and using the disclosed compositions. Thus, if there are a variety of additional steps that can be performed it is understood that each of these additional steps can be performed with any specific aspect or combination of aspects of the disclosed methods, and that each such combination is specifically contemplated and should be considered disclosed.

All publications mentioned herein are incorporated herein by reference to disclose and describe the methods and/or materials in connection with which the publications are cited.

1. Definitions

In this specification and in the claims that follow, reference will be made to a number of terms that shall be defined to have the following meanings:

Throughout this specification, unless the context requires otherwise, the word "comprise," or variations such as "comprises" or "comprising," will be understood to imply the inclusion of a stated integer or step or group of integers or steps but not the exclusion of any other integer or step or group of integers or steps.

It must be noted that, as used in the specification and the appended claims, the singular forms "a," "an" and "the" include plural referents unless the context clearly dictates otherwise. Thus, for example, reference to "a system" includes combination of two or more such systems, and the like.

"Optional" or "optionally" means that the subsequently described event or circumstance can or cannot occur, and that the description includes instances where the event or circumstance occurs and instances where it does not.

"Consists essentially of" limits the scope to the specified materials (i.e. CaO and mayenite) or steps and those that do not materially affect the basic and novel characteristic(s) of the claimed invention.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

The term "thermal energy storage" as defined herein is referenced to a system capable of temporary holding thermal energy in substances for later utilization.

The term "sensible thermal energy storage" as defined herein is referenced to energy stored in vibrational modes of molecules. Sensible TES systems store energy by changing the temperature of the storage medium, which can be water, brine, rock, soil, concrete, sand, molten salt and the like.

The term "latent thermal energy storage" as defined herein is referenced to energy stored in medium as it changes phase, for example cold storage water/ice and heat storage by melting paraffin waxes. Latent TES units are generally smaller than sensible storage units.

The term "thermochemical energy storage" is referred to energy stored in chemical bonds of molecules, or in the reaction between the reactants. For example, metal oxides, reversible reduction oxidation reactions, and the like. Thermochemical energy storage can also include a system that allows separation of reactants that can be subsequently combined again in exothermic reaction. For example, the separation and later re-combination of $CO_2$ and CaO.

The term "sorbent" as used herein is referred to a solid material capable of absorbing\liquids or gases via fluid-solid chemical reaction The term "heat exchange reactor" as used herein is referred to a reactor used to transfer heat between one or more fluids. The fluids can be separated by a solid wall to prevent mixing or they can be in direct contact.

The term "adiabatic reactor" as used herein is referred to a reactor that utilizes an adiabatic process that occurs without loss of heat, or matter, between the reactor and its surroundings.

The terms "gas expander" or "turboexpander," or "expansion turbine" can be used interchangeably and are referred to a centrifugal or axial flow turbine through which a high pressure gas is expanded to produce work.

The term "exothermic reaction" as referred herein is a chemical reaction that releases energy by heat.

The term "endothermic reaction" as referred herein is a reaction in which the system absorbs energy from its surroundings. In some aspects, the absorbed energy is in the form of heat.

The terms "first," "first heat exchange medium," and the like, where used herein, do not denote any order, quantity, or importance, and are used to distinguish one element from another, unless specifically stated otherwise.

A supercritical fluid as described herein is a fluid at a temperature above its critical temperature and at a pressure above its critical pressure. A supercritical fluid exists at or above its "critical point," the point of highest temperature and pressure at which the liquid and vapor (gas) phases can exist in equilibrium with one another. Above critical pressure and critical temperature, the distinction between liquid and gas phases disappears. A supercritical fluid possesses approximately the penetration properties of a gas simultaneously with the solvent properties of a liquid. Accordingly, supercritical fluid extraction has the benefit of high penetrability and good solvation.

Reported critical temperatures and pressures include: for pure water, a critical temperature of about 374.2° C., and a critical pressure of about 221 bar; for carbon dioxide, a critical temperature of about 31° C. and a critical pressure of about 72.9 atmospheres (about 1072 psig). Near-critical water has a temperature at or above about 300° C. and below the critical temperature of water (374.2° C.), and a pressure high enough to ensure that all fluid is in the liquid phase. Sub-critical water has a temperature of less than about 300°

C. and a pressure high enough to ensure that all fluid is in the liquid phase. Sub-critical water temperature may be greater than about 250° C. and less than about 300° C., and in many instances sub-critical water has a temperature between about 250° C. and about 280° C. The term "hot compressed water" is used interchangeably herein for water that is at or above its critical state, or defined herein as near-critical or sub-critical, or any other temperature above about 50° C. (preferably, at least about 100° C., above about 150° C., or above about 200° C.) but less than subcritical, and at pressures such that water is in a liquid state.

As used herein, a fluid which is "supercritical" (e.g. supercritical water, supercritical $CO_2$, etc.) indicates a fluid which would be supercritical if present in pure form under a given set of temperature and pressure conditions. For example, "supercritical water" indicates water present at a temperature of at least about 374.2° C. and a pressure of at least about 221 bar, whether the water is pure water, or present as a mixture (e.g. water and ethanol, water and $CO_2$, etc.). Thus, for example, "a mixture of sub-critical water and supercritical carbon dioxide" indicates a mixture of water and carbon dioxide at a temperature and pressure above that of the critical point for carbon dioxide but below the critical point for water, regardless of whether the supercritical phase contains water and regardless of whether the water phase contains any carbon dioxide. For example, a mixture of sub-critical water and supercritical $CO_2$ may have a temperature of about 250° C. to about 280° C. and a pressure of at least about 225 bar.

A weight percent of a component, unless specifically stated to the contrary, is based on the total weight of the formulation or composition in which the component is included.

Disclosed are compounds, compositions, and components that can be used for, can be used in conjunction with, can be used in preparation for, or are products of the disclosed methods and compositions. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein. For example, if a number of different polymers and agents are disclosed and discussed, each and every combination and permutation of the polymer and agent are specifically contemplated unless specifically indicated to the contrary. Thus, if a class of molecules A, B, and C are disclosed as well as a class of molecules D, E, and F and an example of a combination molecule, A-D is disclosed, then even if each is not individually recited, each is individually and collectively contemplated. Thus, in this example, each of the combinations A-E, A-F, B-D, B-E, B-F, C-D, C-E, and C-F are specifically contemplated and should be considered disclosed from disclosure of A, B, and C; D, E, and F; and the example combination A-D. Likewise, any subset or combination of these is also specifically contemplated and disclosed. Thus, for example, the sub-group of A-E, B-F, and C-E are specifically contemplated and should be considered disclosed from disclosure of A, B, and C; D, E, and F; and the example combination A-D. This concept applies to all aspects of this disclosure including, but not limited to, steps in methods of making and using the disclosed compositions. Thus, if there are a variety of additional steps that can be performed it is understood that each of these additional steps can be performed with any specific embodiment or combination of embodiments of the disclosed methods, and that each such combination is specifically contemplated and should be considered disclosed.

2. System

Disclosed herein is a system that can allow affordable and efficient storage of energy. It is desirable to obtain a thermal energy storage system having a high cyclic durability, high volumetric energy density, capable of operating throughout a wide temperature range, while still providing economic feasibility. The system disclosed herein utilizes a reversible gas-solid reaction, wherein the claimed reaction has substantially no potential side reaction, and the reactants and/or products are non-toxic and non-corrosive. The energy storage described herein uses highly reversible and highly energetic gas-solid reaction to store energy on a thermochemical basis. In some aspects, the system described herein comprises a reactor comprising a sorbent. In other aspects, the system comprises a gas source. In yet other aspects, the gas source can comprise a storage tank. In still further aspects, the system comprises a reactor comprising a sorbent and a gas source. In still further aspects, the system comprises a reactor comprising a sorbent and a storage tank.

Accordingly, disclosed herein is a system comprising: a) a reactor comprising a $CO_2$ sorbent comprising i) CaO and mayenite or ii) $Li_4SiO_4$, or a combination thereof; and b) a $CO_2$ source, wherein the $CO_2$ source is in fluid communication with the reactor to allow flow of $CO_2$ between the $CO_2$ source and the reactor. The $CO_2$ source can comprise any source known in the art. In some aspects, for example and without limitation the $CO_2$ source can comprise a commercially available $CO_2$ provided in a storage tank. In yet other aspects, $CO_2$ source can comprise a recovered $CO_2$ from a power plant stream; a $CO_2$ separated from air and subsequently concentrated and delivered to the system; a recycled $CO_2$; an in-line $CO_2$ deliver system that is in a gas communication with other systems capable of delivering $CO_2$. In some aspects, $CO_2$ is stored as a liquid. In yet other aspects, $CO_2$ is stored as a gas. In certain aspects, the $CO_2$ source utilized in the disclosed system can be recycled back to the storage tank, vented after use, or utilized in a different system that requires use of $CO_2$.

In one aspect, the $CO_2$ sorbent consists essentially of CaO and mayenite. In another aspect, the $CO_2$ sorbent consists of CaO and mayenite.

It is further understood that in some aspects, the $CO_2$ sorbents can operate at temperatures greater than about 550° C., greater than about 600° C., greater than about 650° C., greater than about 700° C., greater than about 750° C., greater than about 800° C., or greater than about 850° C. In yet other aspects, the $CO_2$ sorbents can operate in a temperature range from about 550° C. to about 900° C., including exemplary values of about 600° C., about 650° C., about 700° C., about 750° C., about 800° C., about 850° C., and about 900° C. In yet other aspects, the $CO_2$ sorbents can operate in any temperature range between any two of the above stated values. For example, the $CO_2$ sorbents can operate from about 550° C. to about 800° C., about 650° C. to about 850° C., or from about 700° C. to about 900° C.

In some aspects, a highly reversible gas-solid carbonation-decarbonation reaction cycle using $CO_2$ sorbent can be employed. In some aspects, a high temperature carbonation-decarbonation cycle can be based on the reaction shown in Scheme 1:

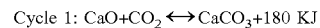

Cycle 1: $CaO + CO_2 \leftrightarrow CaCO_3 + 180$ KJ　　　　(Scheme 1)

In yet other aspects, a high temperature carbonation-decarbonation cycle can be based on the reaction shown in Scheme 2:

Cycle 2: $Li_4SiO_2+CO_2 \leftrightarrow Li_2CO_3+Li_2SiO_3+135$ KJ  (Scheme 2)

In still further aspects, a high temperature carbonation-decarbonation cycle can be based on the combination of Cycle 1 and Cycle 2. It is understood that in the aspects, wherein reactions of both Cycle 1 and Cycle 2 are employed, the cycles can be conducted in any order. In some aspects, Cycle 1 is employed prior to Cycle 2. In other aspects, Cycle 2 is conducted prior to Cycle 1. In yet other aspects, Cycle 1 and Cycle 2 are conducted simultaneously.

It is understood that the described cycles are based on the reversible reactions of carbon dioxide with solid calcium oxide (lime) and solid lithium orthosilicate sorbents. The calcium oxide carbonates to form solid calcium carbonate whereas the lithium orthosilicate carbonates to form an equimolar mixture of lithium carbonate and lithium metasilicate. In certain aspects, the sorbents described herein can undergo, without degradation, repeated endothermic-exothermic carbonation cycles at a described above temperature range in a closed loop system.

In some aspects, the $CO_2$ sorbent comprises CaO and mayenite. In yet other aspects, the $CO_2$ sorbent comprises $Li_4SiO_4$. In yet other aspects, the $CO_2$ sorbent comprises CaO, mayenite, and $Li_4SiO_4$.

In certain aspects, the $CO_2$ sorbent is a porous sorbent. In still further aspects, the pores of the sorbent can have a diameter in the range from about 1 nm to about 100 nm, including exemplary values of about 3 nm, about 5 nm, about 8 nm, about 10 nm, about 15 nm, about 20 nm, about 25 nm, about 30 nm, about 35 nm, about 40 nm, about 45 nm, about 50 nm, about 55 nm, about 60 nm, about 65 nm, about 70 nm, about 75 nm, about 80 nm, about 85 nm, about 90 nm, and about 95 nm. In yet other aspects, the sorbent comprises micropores having a diameter in the range from about 1 nm to about 10 nm, including exemplary values of about 2 nm, about 3 nm, about 4 nm, about 5 nm, about 6 nm, about 7 nm, about 8 nm, and about 9 nm. In still further aspects, the micropores can have a diameter between any two of the above stated values. In yet other aspects, the sorbent can comprise mesopores having a diameter in the range from about 10 nm to about 100 nm, including exemplary values of about 20 nm, about 30 nm, about 40 nm, about 50 nm, about 60 nm, about 70 nm, about 80 nm, and about 90 nm. In still further aspects, the sorbent can comprise macropores with a diameter greater than about 100 nm. It is understood that in some aspects, the greater pore diameter can result in a decreased total pore surface area.

In certain aspects, the sorbent described herein have a surface area in the range from about 1 to about 25 $m^2/g$, including exemplary values ranging from of about 2 to 15 $m^2/g$.

It is further understood that the pore diameter of the sorbent can be affected by a temperature. In some aspects, at the higher reaction temperatures the sorbent can undergo sintering and form agglomerates having a higher pore size. In certain aspects, to improve long-term stability of the $CO_2$ sorbents, the sorbent can be modified by integrating reinforcing structures. As disclosed herein CaO can be reinforced by mayenite.

In the aspects, wherein CaO and mayenite are present, it is understood that CaO and mayenite can be in any amount relative to each other. It is further understood that ratio of CaO and mayenite present in the sorbent can affect the sorbent degradation stability. In some aspects, CaO can be present in the range from about 20 wt. % to about 80 wt. % based on the total weight of CaO and mayenite, including exemplary values of about 21 wt. %, about 22 wt. %, about 23 wt. %, about 24 wt. %, about 25 wt. %, about 26 wt. %, about 27 wt. %, about 28 wt. %, about 29 wt. %, about 30 wt. %, about 31 wt. %, about 32 wt. %, about 33 wt. %, about 34 wt. %, about 35 wt. %, about 36 wt. %, about 37 wt. %, about 38 wt. %, about 39 wt. %, about 40 wt. %, about 41 wt. %, about 42 wt. %, about 43 wt. %, about 44 wt. %, about 45 wt. %, about 46 wt. %, about 47 wt. %, about 48 wt. %, about 49 wt. %, about 50 wt. %, about 51 wt. %, about 52 wt. %, about 53 wt. %, about 54 wt. %, about 55 wt. %, about 56 wt. %, about 57 wt. %, about 58 wt. %, about 59 wt. %, about 60 wt. %, about 61 wt. %, about 62 wt. %, about 63 wt. %, about 64 wt. %, about 65 wt. %, about 66 wt. %, about 67 wt. %, about 68 wt. %, about 69 wt. %, about 70 wt. %, about 71 wt. %, about 72 wt. %, about 73 wt. %, about 74 wt. %, about 75 wt. %, about 76 wt. %, about 77 wt. %, about 78 wt. %, and about 79 wt. %. In yet other aspects, CaO can be present in any concentration between any two cited above values. In some aspects, CaO can be present from about 27 wt. % to about 40 wt %, from about 47 wt. % to about 73 wt. %, or from about 54 wt. % to about 71 wt. %.

In yet other aspects, mayenite can be present in any amount about 20 wt. % to about 80 wt. % based on the total weight of CaO and mayenite, including exemplary values of about 21 wt. %, about 22 wt. %, about 23 wt. %, about 24 wt. %, about 25 wt. %, about 26 wt. %, about 27 wt. %, about 28 wt. %, about 29 wt. %, about 30 wt. %, about 31 wt. %, about 32 wt. %, about 33 wt. %, about 34 wt. %, about 35 wt. %, about 36 wt. %, about 37 wt. %, about 38 wt. %, about 39 wt. %, about 40 wt. %, about 41 wt. %, about 42 wt. %, about 43 wt. %, about 44 wt. %, about 45 wt. %, about 46 wt. %, about 47 wt. %, about 48 wt. %, about 49 wt. %, about 50 wt. %, about 51 wt. %, about 52 wt. %, about 53 wt. %, about 54 wt. %, about 55 wt. %, about 56 wt. %, about 57 wt. %, about 58 wt. %, about 59 wt. %, about 60 wt. %, about 61 wt. %, about 62 wt. %, about 63 wt. %, about 64 wt. %, about 65 wt. %, about 66 wt. %, about 67 wt. %, about 68 wt. %, about 69 wt. %, about 70 wt. %, about 71 wt. %, about 72 wt. %, about 73 wt. %, about 74 wt. %, about 75 wt. %, about 76 wt. %, about 77 wt. %, about 78 wt. %, and about 79 wt. %. In yet other aspects, mayenite can be present in any concentration between any two cited above values. In some aspects, mayenite can be present from about 27 wt. % to about 53 wt %, from about 29 wt. % to about 36 wt. %, or from about 63 wt. % to about 73 wt. %.

In yet other exemplary aspects, CaO and mayenite can be present in any amount. In some aspects the sorbent comprises about 27 wt % of CaO and about 73 wt % of mayenite. In still further exemplary aspects, the sorbent comprises about 37 wt. % of CaO and about 63 wt. % of mayenite. In yet further exemplary aspects, the sorbent can comprise about 64 wt. % of CaO and about 36 wt. % of mayenite. In still further exemplary aspects, the sorbent can comprise about 71 wt. % of CaO and about 29 wt % of mayenite.

In the aspects, wherein the $CO_2$ sorbent comprises CaO, mayenite and $Li_4SiO_4$, the components can be present in any ratio relative to each other. In some aspects, in the sorbent comprising a combination of CaO, mayenite, and $Li_4SiO_4$, CaO and mayenite can be present in any foregoing ratios relatively to each other and to $Li_4SiO_4$. In some aspects, $Li_4SiO_4$ can be present in a combination of CaO, mayenite, and $Li_4SiO_4$ in an amount from about 5 wt. % to about 75 wt. % of the total weight of the sorbent, including exemplary values of about 10 wt. %, about 15 wt. %, about 20 wt. %, about 25 wt. %, about 30 wt. %, about 35 wt. %, about 40 wt. %, about 45 wt. %, about 50 wt. %, about 65 wt. %, and about 70 wt. %, Without wishing to be bound by any theory, it is understood that the sorbent comprising a combination of CaO, mayenite, and $Li_4SiO_4$ provides potential synergies in the thermal storage system operation. For example, it is assumed since the lithium sorbent can have a slightly faster rate of reaction on start-up, and although the calcium sorbent also reacts fast enough initially to achieve the required ramp rate for many desirable applications, this attribute of the lithium sorbent aides in other applications requiring quick start. Furthermore, since the lithium sorbent can potentially reach equilibrium at slightly lower temperatures than the calcium sorbent, it is possible to operate this sorbent at higher $CO_2$ partial pressures (near-atmospheric pressures) in lower temperature power cycles. In some aspects, the partial pressure of $CO_2$ can be in a the range from about 0.8 atm to about 1.5 atm, including exemplary values of about 0.9 atm, about 1.0 atm, about 1.1 atm, about 1.2 atm, about 1.3 atm, and about 1.4 atm. In yet other aspects, the temperature power cycles can be in range from about 500° C. to about 650° C., including exemplary values of about 510° C., about 520° C., about 530° C., about 540° C., about 550° C., about 560° C., about 570° C., about 580° C., about 590° C., about 600° C., about 610° C., about 620° C., about 630° C., and about 640° C. In other aspects, when higher temperature applications are desired, the calcium sorbent can operate closer to atmospheric pressure. This minor variability to reaction equilibrium temperature allows for a portion of the sorbent to begin reacting earlier in the temperature profile, synergistically causing for heat to be generated/absorbed and creates a positive feedback loop to accelerate the reaction under start-up.

In certain aspects, the sorbent is heat treated in a non-reacting gas such as nitrogen, air, or helium prior to the use in a system at a temperature from about 600° C. to about 1,000° C., including exemplary values of about 650° C., about 700° C., about 750° C., about 800° C., about 850° C., about 900° C., and about 950° C., thereby producing a heat treated sorbent. In some aspects, the heat treatment is performed for a period of time from about 10 minutes to about 60 minutes, including exemplary values of about 20 minutes, about 30 minutes, about 40 minutes, and about 50 minutes. In yet other aspects, the sorbent is heat treated in a steam. In yet other aspects, following this heat treatment, the sorbent can be further heat treated in a gas containing about 2 to about 30 volume % $CO_2$ from about 600° C. to about 800° C., including exemplary values of about 650° C., about 700° C., and about 750° C. In yet other aspects, the heat treatment can be done for a time period of about 4 to about 20 hours, including exemplary values of about 6, about 8, and about 12 hours. In certain aspects, the heat treatment of the sorbent prior to the use in a system improves the sorbent durability and stability. In certain aspects, the heat treatment of the sorbent can improve a reaction rate (e.g. to increase the amount of $CO_2$ that can be reacted with the sorbent in a given time). In certain exemplary aspects, the absorption of $CO_2$ during the first reaction cycle lasting for about an can be increased from about 10 wt % to about 36 wt %, including exemplary values of about 15 wt. %, about 20 wt %, about 25 wt. %, about 30 wt. %, and about 35 wt. %, comparatively to a substantially identical sorbent that was not heat treated prior to use in a system. Without wishing to be bound by any theory, it is hypothesized that the heat treating of the sorbent prior to the use in a system can activate the sorbent by structuring the surface morphology and increasing access of the $CO_2$ to the pore structure.

In yet other aspects, the carbonated sorbent can undergo a regeneration process at a temperature from about 650° C. to about 950° C., including exemplary values of about 700° C., about 750° C., about 800° C., about 850° C., and about 900° C., for a time period of about 30 minutes to about 12 hours min, including exemplary values of about 1 hour, about 1.5 hour, about 2 hours, about 2.5 hours, about 3 hours, about 3.5 hours, about 4 hours, about 4.5 hours, about 5 hours, about 5.5 hours, about 6 hours, about 6.5 hours, about 7 hours, about 7.5 hours, about 8 hours, about 8.5 hours, about 9 hours, about 9.5 hours, about 10 hours, about 10.5 hours, about 11 hours, and about 11. 5 hours, in the presence of $CO_2$. In some aspects, the regeneration process can convert the calcium carbonate ($CaCO_3$) present in the sorbent back to calcium oxide (CaO) to make it ready for the next cycle. In yet other aspects, wherein the sorbent comprises lithium metal silicate, the regeneration process allows the lithium metal silicate to react with the lithium carbonate to release $CO_2$ and form lithium orthosilicate to make the sorbent ready for the next cycle. In yet other aspects, the sorbent can undergo a regeneration process at a temperature from about 600° C. to about 850° C., including exemplary values of about 650° C., about 700° C., about 750° C., and about 800° C., for a time period from about 30 minutes to about 300 minutes, including exemplary values of about 60 minutes, about 90 minutes, about 120 minutes, about 150 minutes, about 180 minutes, about 210 minutes, and about 240 minutes, in the presence of nitrogen or air. Without wishing to be bound by any theory it is hypothesized that the regeneration process can rejuvenate the sorbent to its activated state without causing a loss in sorbent durability so that cycles can be repeated multiple times. It is further understood that the regeneration process can be conducted in the presence of $CO_2$, nitrogen, air, an inert gas, or any combination thereof. It is further understood that if the combination of gases is employed the ratio of each gas in the combination can be determined by one of ordinary skills based on the desirable outcomes In certain aspects, the sorbent described herein can withstand from about 100 to about 30,000 reaction cycles without any substantial degradation, including exemplary values of about 200, about 500, about 1,000, about 1,500, about 2,000, about 2,500, about 3,000, about 3,500, about 4,000, about 4,500, about 5,500, about 6,000, about 6,500, about 7,000, about 7,500, about 8,000, about 8,500, about 9,000, about 9,500, about 10,000, about 10,500, about 11,000, about 11,500, about 12,000, about 12,500, about 13,000, about 13,500, about 14,000, about 14,500, about 15,500, about 16,000, about 16,500, about 17,000, about 17,500, about 18,000, about 18,500, about 19,000, about 19,500, about 20,000, about 20,500, about 21,000, about 21,500, about 22,000, about 22,500, about 23,000, about 23,500, about 24,000, about 24,500, about 25,500, about 26,000, about 26,500, about 27,000, about 27,500, about 28,000, about 28,500, about 29,000, and about 29,500. In yet other aspects, the sorbent described herein can withstand any number of cycles in between any cited above values without any substantial degradation. In some aspects, the sorbent can withstand from about 1,000 to about 20,000 cycles or from about 5,000 to about 30,000 cycles without any substantial degradation.

In certain aspects, the absence of the substantial degradation of the sorbent can be determined by an amount of the $CO_2$ that can react with the sorbent in each consequent reaction cycle conducted after the first cycle as compared to an amount of the $CO_2$ reacted with the sorbent in the first cycle. In some aspects, the amount of the $CO_2$ reacted with the sorbent in each consequent reaction cycle conducted after the first cycle is at least about 80% of the $CO_2$ reacted with the sorbent in the first cycle, at least about 85%, at least about 90%, at least about 95%, at least about 99%, or at least about 99.8% of $CO_2$ reacted with the sorbent in the first cycle.

In some aspects, the reactor described herein can comprise a heat exchange reactor or an adiabatic reactor. In certain aspects, the reactor is a heat exchange reactor. In other aspects, the reactor is an adiabatic reactor. It is understood that any heat exchange and adiabatic reactors known in the art can be utilized. It is further understood that the reactor can have any shape known in the art. In some aspects, the reactor is a tube. In other aspects, the reactor is a shell. In yet other aspects, the reactor is a shell and tube reactor or a fluidized-bed reactor. It is further understood that the dimensions of the reactor can be easily determined by one of ordinary skill in the art depending on the desired outcome. In some aspects, it is understood that the size of the reactor can be fitted to house a sufficient amount of sorbent effective to react with a desired amount of $CO_2$.

In some aspects, the system can further comprise a) a heat source and a) a first heat transfer medium vessel that is configured to be in thermal communication with the heat source and the reactor. In yet other aspects, the system described herein can further comprise an electricity generating device and a second heat transfer medium vessel that is configured to be in thermal communication with the reactor and the electricity generating device.

In yet other aspects, the electricity generating device can comprise a steam generator and a turbine, supercritical $CO_2$ heater and turbine, or air heater and turbine. In still further aspects, the electricity generating device can be in further thermal communication with the heat source via the first heat transfer medium vessel or the second heat transfer medium vessel. It is further understood that the first and the second heat transfer medium vessels can comprise any vessels known in the art, for example and without limitations, they can comprise pipe vessel, tube vessel, shell and tube, plate and fin, microchannel, printed circuit or the like.

In some aspects, the system can further comprise a heat transfer medium. In yet other aspects, the system can be configured to transfer a heat transfer medium at a temperature about 600° C. to about 1,000° C., including exemplary values of about 650° C., about 700° C., about 750° C., about 800° C., about 850° C., about 900° C., and about 950° C. In certain aspects, the system can be configured to transport a heat transfer medium at a temperature of about 600° C. to about 950° C. via the first heat transfer medium vessel from the heat source to the reactor.

In certain aspects, the heat transfer medium or the heat transfer fluid can comprise any materials known in the art capable of efficient transfer of heat. In some aspects, the heat transfer medium (heat transfer fluid, or HTF) can comprise synthetic oils, supercritical $CO_2$ ($sCO_2$), supercritical $H_2O$ ($sH_2O$), He, nitrogen, liquid metal, inert gas, steam, or air. In yet other aspect, the first heat transfer medium comprises liquid metal, supercritical $CO_2$, helium, nitrogen, air, or an inert gas. It is further understood that the choice of the reactor utilized in the thermochemical energy storage system can determine the choice of the heat transfer medium.

In some aspects, the system can further comprise a gas expander that is in fluid communication with the $CO_2$ source and the reactor. The gas expanders are known in the art.

In certain aspects, the heat source present in the system can comprise a solar thermal energy source; for example. In the exemplary aspects, wherein the heat source comprises a solar thermal energy source, the solar energy can be concentrated and directed using mirrors for direct heating of the heat transfer medium. In yet other aspects, the heat source present in the system can comprise a supercritical $CO_2$ having a temperature of at least about 600° C., at least about 650° C., at least about 700° C., at least about 750° C., at least about 800° C., at least about 850° C., at least about 900° C., or at least about 950° C. In yet other aspects, the heat source can comprise any heat source known in the art, for example and without limitation, a gas fire plant, a nuclear reactor, and the like.

In some aspects of this disclosure, the first heat transfer medium vessel comprises a first heat transfer medium.

FIG. 1 shows an exemplary thermochemical storage energy system. This exemplary system is comprised of a heat exchange reactor 102, a gas compressor 104, a $CO_2$ storage tank 106, heat source 110, and a power block 108. The heat exchanger reactor 102 contains a fixed bed of a sorbent and a heat transfer fluid (HTF) (or a heat transfer medium) that indirectly exchanges heat with the bed. By controlling the temperature and partial pressure in the sorbent bed, the direction and rate of the gas-solid reaction can be set, resulting in either the endothermic absorption of heat from the HTF or the exothermic release of heat to the HTF. The heat collected, for example solar heat, by the heat source 110 can be utilized to drive the endothermic reaction to produce $CO_2$ and CaO from $CaCO_3$. The $CO_2$ is separated from the sorbent and is compressed in a compressor 104 and stored in a separate $CO_2$ storage tank 106. To reverse the reaction, the $CO_2$ is reintroduced in to the sorbent bed under pressure/temperature conditions favorable to drive an exothermic reaction of producing $CaCO_3$ from $CO_2$ and CaO. The heat from the exothermic reaction is absorbed by the HTF that transferred to a power block 108 to generate electricity from the heat in the HTF. For example, the heat in the HTF can be used to produce steam that can in turn be used to drive turbines that produces electricity.

Figure 2A:
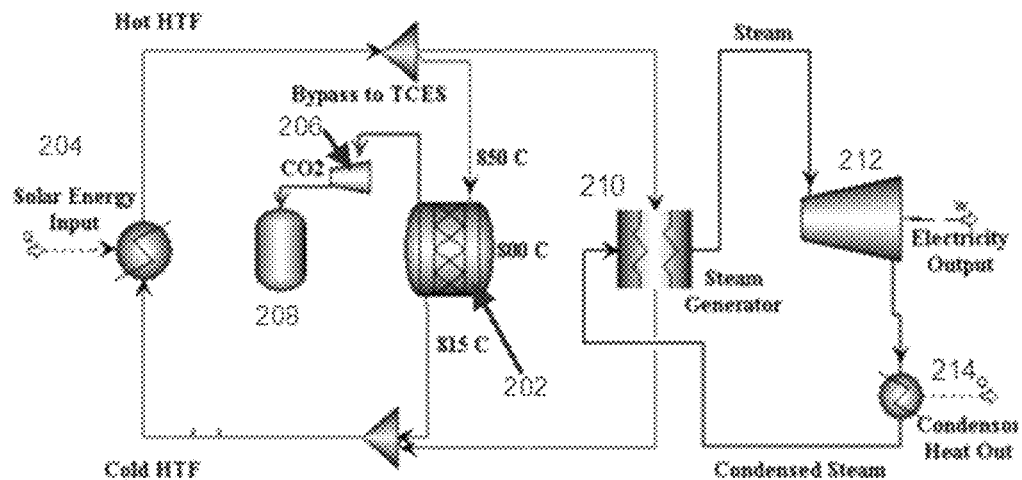
FIGS. 2A and 2B show an exemplary flow schematic of a TCES system charging under peak insolation (2A) and a discharging under zero insolation (2B); temperatures are representative of use with a Stirling power cycle, however a wider range of charging/discharging temperatures can be achieved through use of $CO_2$ pressure swing for integration with supercritical steam and supercritical $CO_2$ power cycles.
Figure 2B:
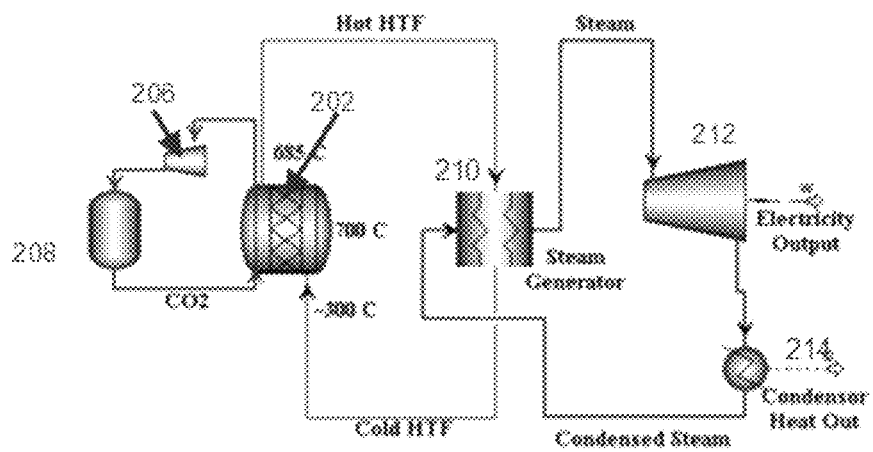

An additional example of the exemplary thermochemical energy system is schematically shown in FIG. 2 This exemplary system uses temperatures representative of a Stirling power cycle. This exemplary TCES system comprises a closed loop shell and tube heat exchange reactor 202. In some aspects, the system further comprises a fix bed sorbent, wherein the sorbent, for example, comprises a pelletized lithium silicate and/or calcium carbonate sorbent. In some aspects, the sorbent can be placed on the shell side of the reactor. In the aspects, where the sorbent is on the shell side, $CO_2$ can be fed through several openings on the shell side (to prevent hot spots) during the forward reaction, and extracted from them during the reverse reaction and stored in a separate pressure vessel. The solid sorbent remains stationary and requires no conveyors or separate storage tanks. A heat transfer fluid (HTF) is passed through the tube side of the reactor to remove and/or apply heat to the pellets from the electricity generator, for example the solar field and/or steam generator 204/210. When solar energy is used as a heat source, 204, the thermal energy is collected by HTF and is used to drive the equilibrium towards the endothermic production of lithium orthosilicate, calcium oxide, and release of gaseous carbon dioxide (FIG. 2 (a)). The released carbon dioxide is compressed in the compressor 206 and is collected in CO2 storage tank 208. In other aspects, the heat collected from the solar collectors can be directly transferred to a steam generator 210 to produce electricity by use of the expansion turbine 212. The unused steam is collected in the condenser 214 and is recycled back to the steam generator as a condensed steam. When insolation has fallen below a threshold, so that energy supplied is less than what is necessary to maintain the sorbent in the desired operating temperature window, the sorbent in the reactor 202 can be re-exposed to the carbon dioxide supplied from the $CO_2$ storage tank 208 to the reactor 202 under lower temperature/higher pressure conditions. The $CO_2$ exothermically reacts with the material to reversely form lithium carbonate, lithium metasilicate, and calcium carbonate. As a result the stored thermal energy is released and transferred to the steam generator 210 with consequent production of electricity by use of the expansion turbine 212 (FIG. 2 (b)).

Figure 3A:
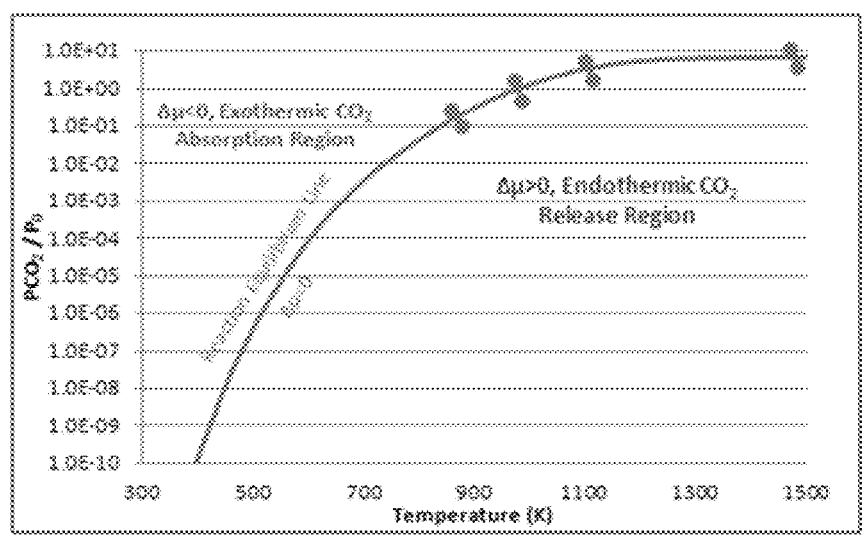
FIGS. 3A and 3B show exemplary reaction equilibrium conditions for lithium orthosilicate carbonation (3A) and calcium oxide carbonation (3B). Reaction direction is reversed as temperature/pressure conditions cross the line; the four (4) set points represent potential set points for the four potential high temperature power cycles. Data calculated from Aspen Plus modeling.
Figure 3B:
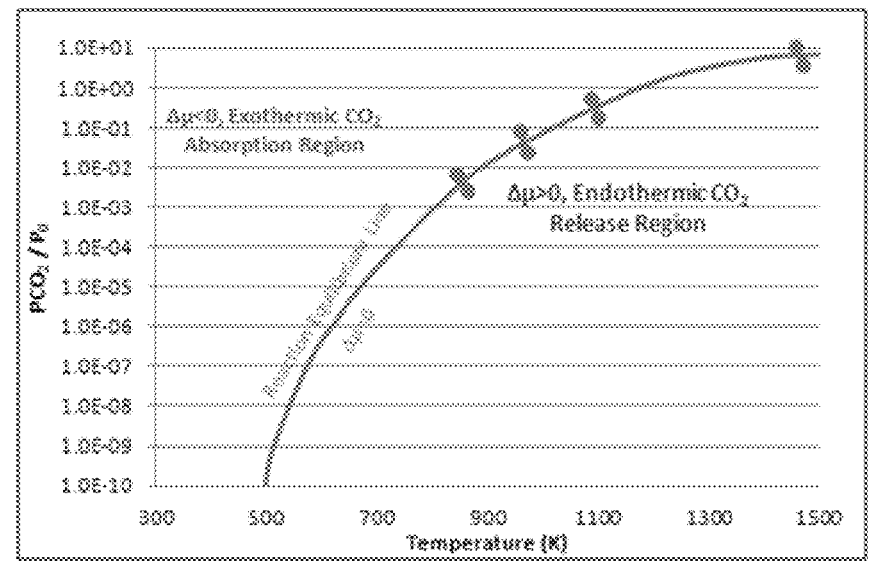

FIG. 3 shows the reaction equilibrium as a function of $CO_2$ partial pressure ($P_0$=1 atm) and temperature. Beyond using a temperature swing to reverse the reactions, a pressure swing can also be used by varying the partial pressure of the carbon dioxide in the reactor.

In some aspects, a temperature swing used to reverse the reactions can be in the range from about 100° C. to about 1,300° C., including exemplary values of about 150° C., about 200° C., about 250° C., about 300° C., about 350° C., about 400° C., about 450° C., about 500° C., about 550° C., about 600° C., about 650° C., about 700° C., about 750° C., about 800° C., about 850° C., about 900° C., about 950° C., about 1,000° C., about 1,050° C., about 1,100° C., about 1,150° C., about 1,200° C., and about 1,250° C. In yet other aspects, a temperature swing can be in the range between any two previously cited values.

In yet other aspects, the partial pressure of the carbon dioxide is the range from about 0.01 atm to about 0.5 atm, including exemplary values of about 0.05 atm, about 0.1 atm, about 0.15 atm, about 0.2 atm, about 0.25 atm, about 0.3 atm, about 0.4 atm, and about 0.45 atm.

In some aspects, the system can further comprise a variable vacuum pump. In certain aspects, the partial pressure can be reduced to sub-ambient pressure in the range of about 0.01 to 1 atm using a variable vacuum pump in the $CO_2$ circulation loop. In certain aspects, the partial pressure of the $CO_2$ in the reactor can be kept low at about 0.1 atm during the rapid initial carbonation to slow it down to achieve the desired heat release and then gradually increased to about 0.3 atm to maintain the heat release.

It is understood that the system disclosed herein can operate equally well with, for example and without limitation, a super-critical steam, super-critical $CO_2$, and Stirling power cycle concentrating solar plants (CSP).

Figure 4:
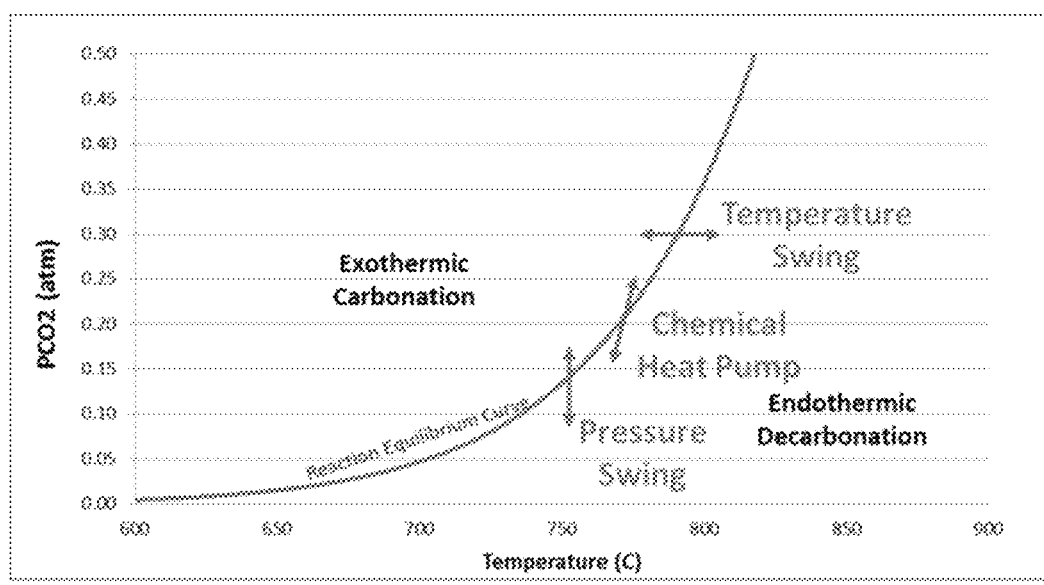
FIG. 4 shows an exemplary gas-solid reaction equilibrium system.

FIG. 4 shows an additional exemplary gas-solid reaction equilibrium diagram. As it can be seen the equilibrium dynamics of the gas-solid reaction allow for the reversible process to occur dynamically throughout a wide temperature range by varying either the reactive gas partial pressure or the sorbent temperature, wherein the pressure and temperature can have any cited above value.

In some aspects, the storage system can further act as a chemical heat pump. In certain aspects, the system can receive heat from any heat source at a nominal temperature for example 700° C. and release the $CO_2$. In further aspects, the reactive carbon dioxide can be pressurized in the fixed sorbent bed to a pressure of 0.15 atm to 0.5 atm for example causing the exothermic sorption of gas at a higher temperature, for example 740-800° C. and delivering heat to the power block at a higher temperature for example 740-800° C. than it was received at from the original heat source.

In some aspects, the $CO_2$ can be stored at a pressure in the range from about 25 bar to about 75 bar, including exemplary values of about 30 bar, about 35 bar, about 40 bar, about 45 bar, about 50 bar, about 55 bar, about 60 bar, and about 65 bar, as a gas or at higher pressure for example >75 bar as a liquid. As one of ordinary skill in the art would appreciate this configuration can minimize storage tank volume, cost, and footprint.

Figure 5:
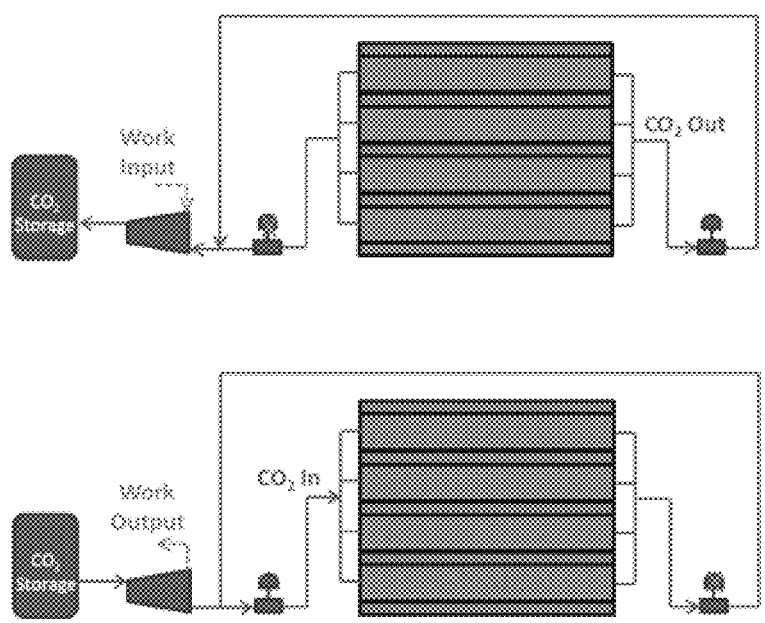
FIG. 5 shows an exemplary schematic of endothermic release of $CO_2$ storage system charging (top); exothermic absorption of $CO_2$ storage system discharging (bottom).

In certain aspects, when the gas is released into the sorbent bed for the exothermic reaction, the $CO_2$ gas from the storage tank can also pass through an expansion turbine to generate electricity. In these aspects, a portion of the compression energy can be recovered during expansion, and the gas temperature rise can be minimized upon reintroduction to the sorbent bed (FIG. 5).

Figure 6:
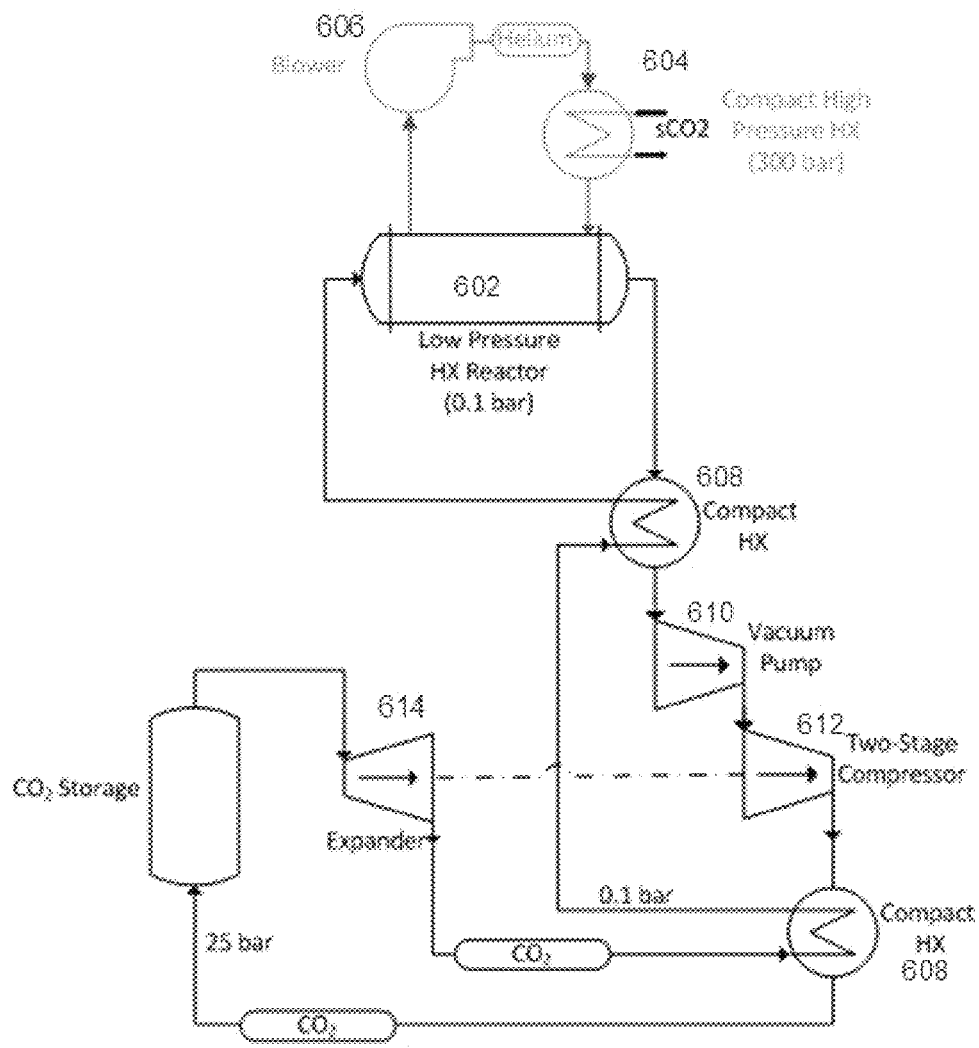
FIG. 6 shows decoupled low pressure heat exchange reactor and high pressure supercritical $CO_2$ heat exchanger.

In some aspects, supercritical $CO_2$ ($sCO_2$) can be used as a heat transfer medium. FIG. 6 shows an exemplary decoupled low pressure heat exchange reactor 602 and high pressure supercritical heat exchanger 604. In these aspects, the heat exchange reactor 602 (HxRx) can be packed with any of the described herein sorbents. The reactor 602 is run at low pressure using a relatively lower pressure heat transfer medium (HTF) for example helium at about 25 to about 75 bar, including exemplary values of about 30 bar, about 35 bar, about 40 bar, about 45 bar, about 50 bar, about 55 bar, about 60 bar, and about 65 bar. The heat exchange reactor 602 can comprise a shell and tube reactor, wherein the sorbent is filled in the tube. In some aspects, fins can be placed within the tube to facilitate heat transfer to the tube wall. In certain aspects, the HTF can comprise a non-corrosive inert gas, for example and without limitation, helium or nitrogen. In some aspects, the HTF can be circulated at a pressure in the range from about 25 to about 75 bar, including exemplary values of about 30 bar, about 35 bar, about 40 bar, about 45 bar, about 50 bar, about 55 bar, about 60 bar, and about 65 bar, using a high temperature blower 606 in a temperature range from about 600 to about 850° C., including exemplary values of about 650° C., about 700° C., about 750° C., and about 800° C. In certain aspects, the HTF exchanges heat with the sorbent. In further aspects, the HTF can further exchange heat with the $sCO_2$ in the high pressure heat exchanger 604 (Hx) operating in the about 600 to about 850° C. range, including exemplary values of about 650° C., about 700° C., about 750° C., and about 800° C. In some aspects, wherein a high temperature and high pressure are employed, a compact heat exchanger can be utilized. In certain aspects, a high pressure is from about 200 bar to about 300 bar, including exemplary values of about 2250 bar, about 250 bar, and about 275 bar. In other aspects, a high temperature is from about 600° C. to about 900° C., including exemplary values of about 650° C., about 700° C., about 750° C., about 800° C., and about 850° C. In certain aspects, the compact heat exchanger 608 can be used to recover the energy required to heat the incoming $CO_2$ to the heat exchange reactor by cooling the $CO_2$ leaving the heat exchange reactor. In some aspects, the compact heat exchanger can comprise a printed circuit or a microchannel. In other aspects, the compact heat exchanger can comprise shell and tube reactor.

In certain aspects, the $CO_2$ can be circulated over the sorbent using appropriate valves (not shown in FIG. 6), heat exchangers 608, and vacuum pump 610 can be used to reduce partial pressure to sub-ambient. The $CO_2$ gas can be further compressed in a compressor 612 to about 25 bar to reduce the required number of storage tanks. In some other aspects, the energy of compression can be partially recovered using an expander 614 coupled to the compressor 612 mechanically and/or electrically. In certain aspects, heat is transferred to the $sCO_2$ 604 during $CO_2$ absorption (discharging) from the sorbent. In other aspects, the heat is received from the $sCO_2$ 604 during $CO_2$ desorption (charging).

Figure 7:
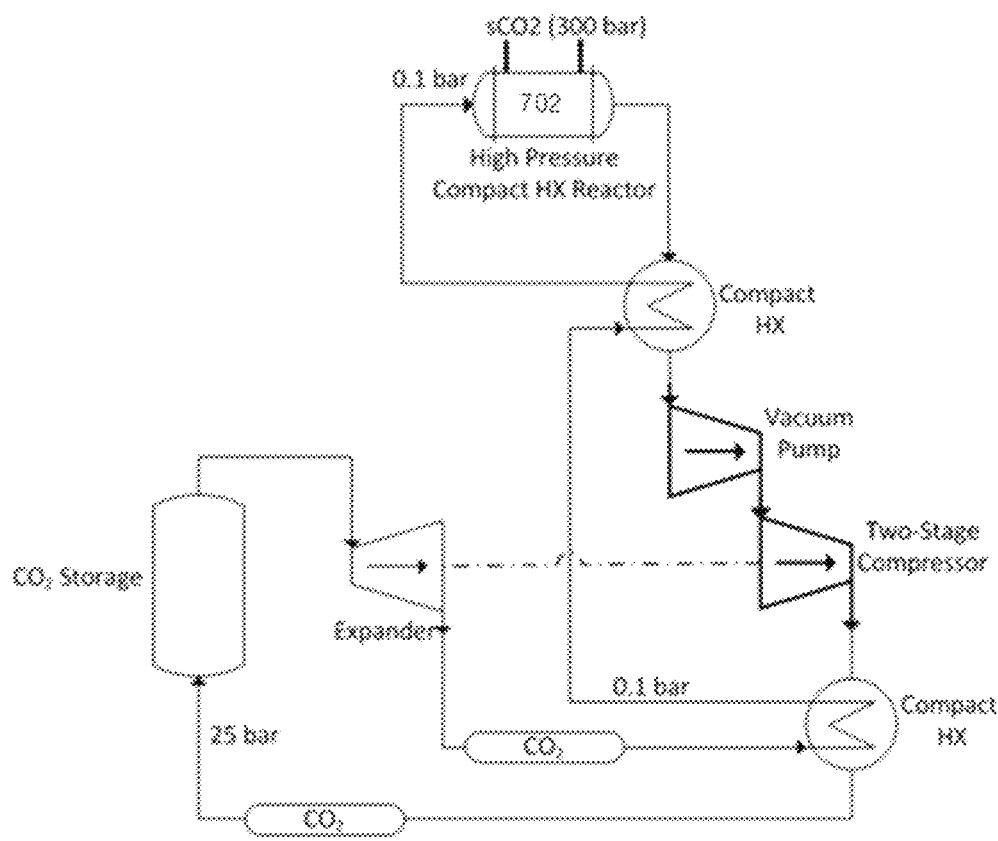
FIG. 7 shows an exemplary coupled high pressure heat exchange reactor with supercritical $CO_2$ as the HTF.

In other aspects, and as represented in FIG. 7, the low pressure heat exchange reactor and high pressure heat exchanger can be combined into a single high pressure heat exchange reactor 702. In some aspects, the heat exchange reactor can comprise a shell reactor, a tube reactor, or a combination thereof. In other aspects, the heat exchange reactor can comprise a compact heat exchange reactor. In certain aspects, the heat exchange reactor can comprise a printed circuit or a microchannel heat exchange reactor. In some aspects, the sorbent could be divided into several compartments to facilitate heat transfer, with the $CO_2$ gas flowing in cross flow to the $sCO_2$ in each compartment. The $CO_2$ can be circulated over the sorbent using e valves, heat exchangers, vacuum pumps similarly to the system depicted in FIG. 6.

Figure 8:
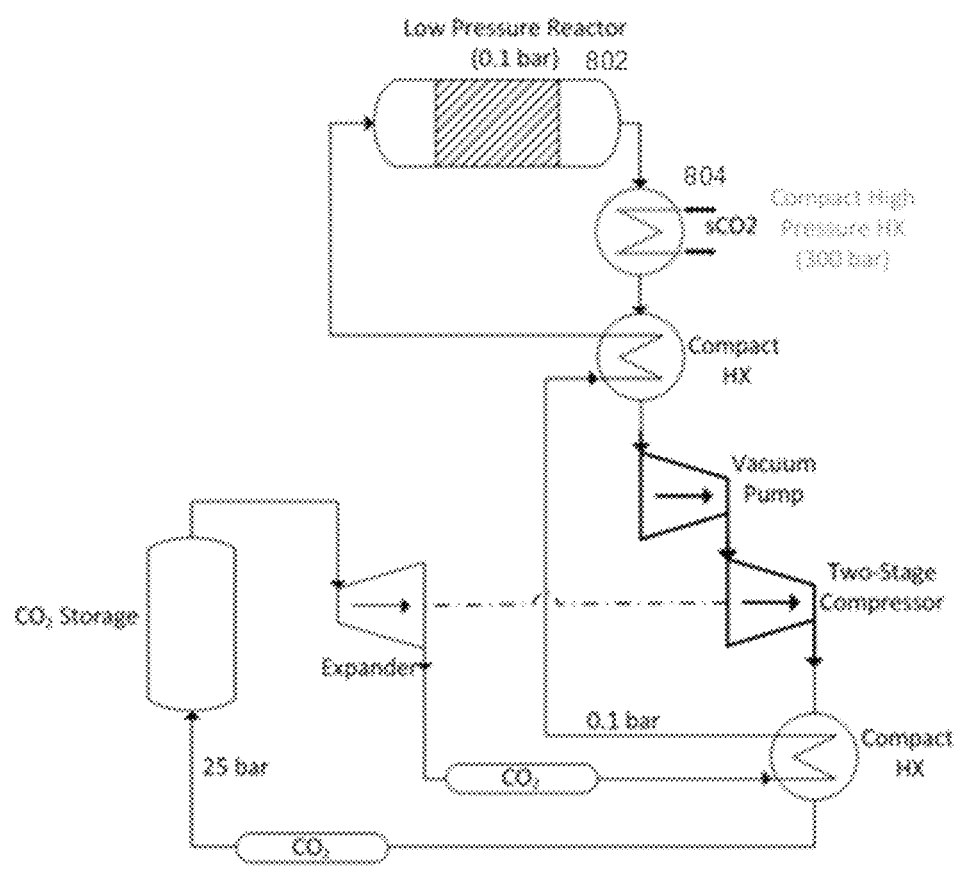
FIG. 8 shows an exemplary decoupled low pressure adiabatic reactor and high pressure supercritical $CO_2$ heat exchanger.

In another aspect and as shown in FIG. 8, the sorbent reactor is an adiabatic reactor 802. In the aspect, the sorbent reactor is run adiabatically to generate the required amount of heat into the outgoing gas for transfer to the $sCO_2$ in the high pressure compact heat exchanger 804. In yet other aspects, the adiabatic reactor is in thermal communication with supercritical $CO_2$. In certain aspects, the CO2 gas can enter the adiabatic reactor for example, at a temperature of 650° C., and become heated to a temperature 750° C. due to $CO_2$ reaction with sorbent. It is further understood that $CO_2$ can be circulated in the system similarly to the system described in FIGS. 6 and 7.

In some other aspects, the heat exchangers can be eliminated by circulating the heated $CO_2$. In these aspects, the heated $CO_2$ is at a temperature from about 650 to about 750° C.

In certain aspects, it is understood that the $CO_2$ storage tank can be kept at a pressure of about 25 bar to about 75 bar, including exemplary values of about 30 bar, about 35 bar, about 40 bar, about 45 bar, about 50 bar, about 55 bar, about 60 bar, and about 65 bar. It is further understood that in some aspects, the $CO_2$ storage tank needs to hold at least about half the amount of $CO_2$ as the amount of sorbent.

3. Methods

Disclosed herein also methods for storing energy. In some aspects disclosed herein is a method of storing energy comprising the steps of: a) in a reactor, heating 1) $CaCO_3$ and mayenite or 2) $Li_2CO_3$ and $Li_2SiO_3$, or a combination thereof, thereby promoting an endothermic chemical reaction to produce $CO_2$ and a $CO_2$ sorbent comprising i) CaO and mayenite or ii) $Li_4SiO_4$, or a combination thereof b) separating the $CO_2$ from the $CO_2$ sorbent. Energy is stored as a potential future chemical reaction between $CO_2$ and the $CO_2$ sorbent. As described elsewhere herein, the chemical reaction between $CO_2$ and the $CO_2$ sorbent is exothermic and, energy in the form of heat is released.

In one aspect, following the separation from the $CO_2$ sorbent, the $CO_2$ can be transported to a $CO_2$ source, such as a $CO_2$ source tank. The $CO_2$ sorbent is, once separated and not in the presence of $CO_2$, available to be recombined with $CO_2$, which can be the separated $CO_2$ or other $CO_2$ from a $CO_2$ source.

In other aspects, the method can further comprise step c) combining $CO_2$ with the $CO_2$ sorbent thereby promoting an exothermic chemical reaction to produce heat and 1) $CaCO_3$ and mayenite or 2) $Li_2CO_3$ and $Li_2SiO_3$, or a combination thereof.

It is understood that the reactor can comprise any reactor described herein. For example and without limitation it can comprise a heat exchange reactor, or an adiabatic reactor. In certain aspects, the $CO_2$ sorbent can comprise any $CO_2$ sorbent described herein.

In certain aspects, the steps (a) to (c) of the disclosed method can be repeated for at least about 100 times, for at least about 200 times, at least about 500 times, at least about 1,000 times, at least about 1,500 times, at least about 2,000 times, at least about 2,500 times, at least about 3,000 times, at least about 3,500 times, at least about 4,000 times, at least about 4,500 times, at least about 5,500 times, at least about 6,000 times, at least about 6,500 times, at least about 7,000 times, at least about 7,500 times, at least about 8,000 times, at least about 8,500 times, at least about 9,000 times, at least about 9,500 times, at least about 10,000 times, at least about 10,500 times, at least about 11,000 times, at least about 11,500 times, at least about 12,000 times, at least about 12,500 times, at least about 13,000 times, at least about 13,500 times, at least about 14,000 times, at least about 14,500 times, at least about 15,500 times, at least about 16,000 times, at least about 16,500 times, at least about 17,000 times, at least about 17,500 times, at least about 18,000 times, at least about 18,500 times, at least about 19,000 times, at least about 19,500 times, at least about 20,000 times, at least about 20,500 times, at least about 21,000 times, at least about 21,500 times, at least about 22,000 times, at least about 22,500 times, at least about 23,000 times, at least about 23,500 times, at least about 24,000 times, at least about 24,500 times, at least about 25,500 times, at least about 26,000 times, at least about 26,500 times, at least about 27,000 times, at least about 27,500 times, at least about 28,000 times, at least about 28,500 times, at least about 29,000 times, at least about 29,500 times, or at least about 30,000 times.

In yet other aspects, the steps (a) through (c) can be repeated at least 1,000 time, wherein the amount of $CO_2$ can be reacted with the $CO_2$ sorbent in step c) throughout the method is at least 90% of the amount of $CO_2$ that could be reacted with the $CO_2$ sorbent prior to performing the method. In some aspects, the amount of $CO_2$ that could be reacted with the $CO_2$ sorbent is at least about 80%, at least about 85%, at least about 90%, at least about 95%, or at least about 99% of the amount of $CO_2$ that could be reacted with the $CO_2$ sorbent prior to performing the method.

In certain aspects, the steps (a) through (c) can be repeated from 1,000 to 20,000 times, wherein the amount of $CO_2$ that can be reacted with the $CO_2$ sorbent in step c) throughout the method is at least 90% of the amount of $CO_2$ that could be reacted with the $CO_2$ sorbent prior to performing the method.

In yet other aspects, the method can further comprise step d) comprising transferring the heat to a heat transfer medium having a first temperature, thereby heating the heat transfer medium to a second temperature that is higher than the first temperature.

In some aspects, the first temperature is from about 600° C. to about 750° C., including exemplary values of about 620° C., about 650° C., about 670° C., about 700° C., and about 720° C. In yet other aspects, the second temperature is about 650° C. to about 800° C., including exemplary values of about 670° C., about 700° C., about 720° C., about 750° C., and about 770° C. In yet other aspects, the second temperature is at least 20° C. higher than the first temperature, at least 30° C. higher than the first temperature, or at least 40° C. higher than the first temperature.

In yet other aspects, the method disclosed herein can comprise a step e) comprising transporting the heat transfer medium to an electricity generating device and utilizing the heat from the heat transfer medium to produce electricity. It is understood that any heat transfer media described herein can be utilized. It is further understood that any electricity generating device described herein can be utilized.

In certain aspects, the heating of the 1) $CaCO_3$ or 2) $Li_2CO_3$ and $Li_2SiO_3$ or a combination thereof can be performed via a first heat transfer medium having a temperature of about 600° C. to about 900° C., including exemplary values of about 650° C., about 700° C., about 750° C., about 800° C., and about 850° C. In certain aspect, the first heat transfer medium is heated from a heat source. It is further understood that the heat source can comprise any heat source described herein, for example and without limitation a solar thermal energy source of supercritical $CO_2$.

Aspects

In view of the described systems and methods and variations thereof, herein below are described certain more particularly described aspects of the inventions. These particularly recited aspects should not however be interpreted to have any limiting effect on any different claims containing different or more general teachings described herein, or that the "particular" aspects are somehow limited in some way other than the inherent meanings of the language and formulas literally used therein.

Aspect 1: A system for storing energy comprising: a) a reactor comprising a $CO_2$ sorbent comprising i) CaO and mayenite or ii) $Li_4SiO_4$, or a combination thereof; and b) a $CO_2$ source, wherein the $CO_2$ source is in fluid communication with the reactor to allow flow of $CO_2$ between the $CO_2$ source and the reactor.

Aspect 2: The system of aspect 1, wherein the system further comprises: c) a heat source; and d) a first heat transfer medium vessel that is configured to be in thermal communication with the heat source and the reactor.

Aspect 3: The system of aspects 1 or 2, wherein the reactor is a heat exchange reactor.

Aspect 4: The system of aspects 1 or 2, wherein the reactor is an adiabatic reactor.

Aspect 5: The system of any one of aspects 1-4, wherein the system further comprises an electricity generating device and a second heat transfer medium vessel that is configured to be in thermal communication with the reactor and the electricity generating device.

Aspect 6: The system of aspect 5, wherein the electricity generating device comprises a steam generator and a turbine.

Aspect 7: The system of aspect 5, wherein the electricity generating device is in further thermal communication with the heat source via the first heat transfer medium vessel or the second heat transfer medium vessel.

Aspect 8: The system of any one of aspects 1-7, wherein the $CO_2$ sorbent is a heat treated $CO_2$ sorbent.

Aspect 9: The system of any one of aspects 1-8, wherein the $CO_2$ sorbent comprises CaO and mayenite.

Aspect 10: The system of any one of aspects 1-8, wherein the $CO_2$ sorbent comprises $Li_4SiO_4$.

Aspect 11: The system of any one of aspects 2-10, wherein the system is configured to transport a heat transfer medium at a temperature of about 600° C. to about 950° C. via the first heat transfer medium vessel from the heat source to the reactor.

Aspect 12: The system of any one of aspects 1-11, wherein the system further comprises a gas expander that is in fluid communication with the $CO_2$ source and the reactor.

Aspect 13: The system of any one of aspects 1-12, wherein the heat source is a solar thermal energy source.

Aspect 14: The system of any one of aspects 2-13, wherein the heat source is supercritical $CO_2$ having a temperature of at least 600° C.

Aspect 15: The system of any one of aspects 2-14, wherein the first heat transfer medium vessel comprises a first heat transfer medium.

Aspect 16: The system of aspect 15, wherein the first heat transfer medium comprises liquid metal, supercritical $CO_2$, helium, nitrogen, air, or an inert gas.

Aspect 17: The system of any one of aspects 4-16, wherein adiabatic reactor is in thermal communication with supercritical $CO_2$.

Aspect 18: A method of storing energy comprising the steps of: a) in a reactor, heating 1) $CaCO_3$ and mayenite or 2) $Li_2CO_3$ and $Li_2SiO_3$, or a combination thereof, thereby promoting an endothermic chemical reaction to produce $CO_2$ and a $CO_2$ sorbent comprising i) CaO and mayenite or ii) $Li_4SiO_4$, or a combination thereof; and b) separating the $CO_2$ from the $CO_2$ sorbent.

Aspect 19: The method of aspect 18, wherein the method further comprises step c) combining $CO_2$ with the $CO_2$ sorbent thereby promoting an exothermic chemical reaction to produce heat and 1) $CaCO_3$ and mayenite or 2) $Li_2CO_3$ and $Li_2SiO_3$, or a combination thereof.

Aspect 20: The method of aspects 18-19, wherein steps a)-c) are repeated at least 1,000 times, wherein the amount of $CO_2$ that can be reacted with the $CO_2$ sorbent in step c) throughout the method is at least 90% of the amount of $CO_2$ that could be reacted with the $CO_2$ sorbent prior to performing the method.

Aspect 21: The method of aspects 18-19, wherein steps a)-c) are repeated from 1,000 to 20,000 times, wherein the amount of $CO_2$ that can be reacted with the $CO_2$ sorbent in step c) throughout the method is at least 90% of the amount of $CO_2$ that could be reacted with the $CO_2$ sorbent prior to performing the method.

Aspect 22: The method anyone of aspects 18-21, wherein the method further comprises d) transferring the heat to a heat transfer medium having a first temperature, thereby heating the heat transfer medium to a second temperature that is higher than the first temperature.

Aspect 23: The method of aspect 16, wherein the method further comprises e) transporting the heat transfer medium to an electricity generating device and utilizing the heat from the heat transfer medium to produce electricity.

Aspect 24: The method of any one of aspects 18-23, wherein the heating of the 1) $CaCO_3$ or 2) $Li_2CO_3$ and $Li_2SiO_3$, or a combination thereof is performed via a first heat transfer medium having a temperature of about 600° C. to about 950° C.

Aspect 25: The method of aspect 24, wherein the method further comprises heating the first heat transfer medium from a heat source.

Aspect 26: The method of aspect 25, wherein the heat source is a solar thermal energy source or supercritical $CO_2$.

Aspect 27: The method of any one of aspects 18-26, wherein the $CO_2$ sorbent comprises CaO and mayenite.

Aspect 28: The method of any one of aspects 18-27, wherein the $CO_2$ sorbent comprises $Li_4SiO_4$.

Aspect 29: The method of any one of aspects 18-28, wherein the reactor is a heat exchange reactor.

Aspect 30: The method of any one of aspects 18-28, wherein the reactor is an adiabatic reactor.

Aspect 31: The methods of any one of aspects 18-30, wherein the separated $CO_2$ is transported to a $CO_2$ source.

Aspect 32: The method of aspect 31, wherein the $CO_2$ source is a $CO_2$ storage tank.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Example 1

A thermogravimetric analysis (TGA test) using 25 mg sorbent was conducted at 750° C. using a cycle of 1 h carbonation using 22.5 volume % $CO_2$, balance $N_2$, followed by 1 h regeneration using $N_2$. The results showed an initial low uptake of $CO_2$ that gradually increased over cycles from a low 0.05 g $CO_2$/g sorbent. It took nearly 200 cycles before maximum capacity of about 0.4 g $CO_2$/g sorbent was achieved. Without wishing to be bound by any theory, this activation period, as uptake capacity gradually increases, is attributed to the structuring of the surface morphology of the sorbent and increased access to the pore structure.

Two subsequent TGA tests were performed on the same sorbent under the same cycling conditions, however an activation period was added to the start of the run. After drying at 125° C. for 30 min, the material was calcined at 900° C. for 10 min to drive off volatiles, and then the material was held in a single continuous carbonation half cycle at 750° C. in 25% $CO_2$ in $N_2$ for 12 hours. Then the material was cycled as in the first run. It was hypothesized that by allowing the material to structure in a single extended activation period, the subsequent cycling would occur at full capacity. It was demonstrated that a fully activated material in the first cycle with a high capacity of 0.4 g/g can be obtained. During cyclic testing over 100 cycles, the sorbent showed high capacity and near perfect durability. It was found that no substantial change in the measured pore size distribution of the material after the first long cycle and after 50 cycles occurred, where as that of the fresh material showed significantly more micro-pores. This verified that the initial heat treatment restructured and stabilized the pore morphology of the sorbent, so that steady state was achieved immediately after the heat treatment.

What is claimed is:

1. A system for storing energy comprising:
   a) a fixed bed reactor comprising a $CO_2$ sorbent comprising i) CaO and mayenite or ii) $Li_4SiO_4$, or a combination thereof; and
   b) a $CO_2$ source, wherein the $CO_2$ source is in fluid communication with the reactor to allow flow of $CO_2$ between the $CO_2$ source and the reactor,
      wherein the system for storing energy is configured as a closed loop system for the recycling of $CO_2$ between the fixed bed reactor and the $CO_2$ source.
2. The system of claim 1, wherein the system further comprises:
   c) a heat source; and
   d) a first heat transfer medium vessel that is configured to be in thermal communication with the heat source and the reactor.
3. The system of claim 1, wherein the fixed bed reactor is a heat exchange reactor.
4. The system of claim 1, wherein the fixed bed reactor is an adiabatic reactor.
5. The system of claim 1, wherein the system further comprises an electricity generating device and a second heat transfer medium vessel that is configured to be in thermal communication with the reactor and the electricity generating device.
6. The system of claim 5, wherein the electricity generating device is in further thermal communication with the heat source via the first heat transfer medium vessel or the second heat transfer medium vessel.
7. The system of claim 1, wherein the $CO_2$ sorbent is a heat treated $CO_2$ sorbent.
8. The system of claim 2, wherein the system is configured to transport a heat transfer medium at a temperature of about 600° C. to about 950° C. via the first heat transfer medium vessel from the heat source to the reactor.
9. The system of claim 1, wherein the system further comprises a gas expander that is in fluid communication with the $CO_2$ source and the reactor.
10. The system of claim 1, wherein the heat source is a solar thermal energy source.
11. The system of claim 4, wherein the adiabatic reactor is in thermal communication with supercritical $CO_2$.
12. A method of storing energy comprising performing the following steps in the system of claim 1:
   a) in a fixed bed reactor, heating 1) $CaCO_3$ and mayenite or 2) $Li_2CO_3$ and $Li_2SiO_3$, or a combination thereof, thereby promoting an endothermic chemical reaction to produce $CO_2$ and a $CO_2$ sorbent comprising i) CaO and mayenite or ii) $Li_4SiO_4$, or a combination thereof; and
   b) separating the $CO_2$ from the $CO_2$ sorbent.
13. The method of claim 12, wherein the method further comprises step c) combining $CO_2$ with the $CO_2$ sorbent thereby promoting an exothermic chemical reaction to produce heat and 1) $CaCO_3$ and mayenite or 2) $Li_2CO_3$ and $Li_2SiO_3$, or a combination thereof.
14. The method of claim 13, wherein steps a)-c) are repeated at least 1,000 times, wherein the amount of $CO_2$ that can be reacted with the $CO_2$ sorbent in step c) throughout the method is at least 90% of the amount of $CO_2$ that could be reacted with the $CO_2$ sorbent prior to performing the method.
15. The method of claim 13, wherein steps a)-c) are repeated from 1,000 to 20,000 times, wherein the amount of $CO_2$ that can be reacted with the $CO_2$ sorbent in step c) throughout the method is at least 90% of the amount of $CO_2$ that could be reacted with the $CO_2$ sorbent prior to performing the method.
16. The method of claim 13, wherein the method further comprises d) transferring the heat to a heat transfer medium having a first temperature, thereby heating the heat transfer medium to a second temperature that is higher than the first temperature.
17. The method of claim 16, wherein the method further comprises e) transporting the heat transfer medium to an electricity generating device and utilizing the heat from the heat transfer medium to produce electricity.
18. The method of claim 12, wherein the heating of the 1) $CaCO_3$ and mayenite or 2) $Li_2CO_3$ and $Li_2SiO_3$, or a combination thereof is performed via a first heat transfer medium having a temperature of about 600° C. to about 950° C.
19. The method of claim 18, wherein the method further comprises heating the first heat transfer medium from a heat source.

20. The method of claim 19, wherein the heat source is a solar thermal energy source or supercritical $CO_2$.

* * * * *